(12) United States Patent
Kardos et al.

(10) Patent No.: US 11,220,931 B2
(45) Date of Patent: Jan. 11, 2022

(54) COOLING SYSTEM FOR A COMBUSTION ENGINE AND A WHR SYSTEM

(71) Applicant: Scania CV AB, Södertälje (SE)

(72) Inventors: Zoltan Kardos, Södertälje (SE); Thomas Sederholm, Hägersten (SE)

(73) Assignee: SCANIA CV AB

( * ) Notice: Subject to any disclaimer, the term of this patent is extended or adjusted under 35 U.S.C. 154(b) by 87 days.

(21) Appl. No.: 16/617,146

(22) PCT Filed: Jun. 1, 2018

(86) PCT No.: PCT/SE2018/050556
§ 371 (c)(1),
(2) Date: Nov. 26, 2019

(87) PCT Pub. No.: WO2018/226141
PCT Pub. Date: Dec. 13, 2018

(65) Prior Publication Data
US 2020/0149436 A1    May 14, 2020

(30) Foreign Application Priority Data

Jun. 7, 2017    (SE) .................................... 1750716-1

(51) Int. Cl.
*F01K 7/16* (2006.01)
*F01K 17/04* (2006.01)
(Continued)

(52) U.S. Cl.
CPC ............ *F01K 23/101* (2013.01); *F01K 17/04* (2013.01); *F01P 7/165* (2013.01); *F01P 2007/146* (2013.01)

(58) Field of Classification Search
CPC ........ F01K 9/003; F01K 17/04; F01K 23/065; F01K 23/101; F01P 7/04; F01P 7/16;
(Continued)

(56) References Cited

U.S. PATENT DOCUMENTS 4,362,131 A    12/1982 Mason
8,365,527 B2    2/2013 Raab
(Continued)

FOREIGN PATENT DOCUMENTS

CN    101749096 A    6/2010
CN    101918695 A    12/2010
(Continued)

OTHER PUBLICATIONS

Machine Translation WO 2014/181824 (Year: 2021).*
(Continued)

*Primary Examiner* — Audrey B. Walter
*Assistant Examiner* — Dapinder Singh
(74) *Attorney, Agent, or Firm* — Ostrolenk Faber LLP (57) ABSTRACT

A cooling system includes a first circuit (A) configured to cool a combustion engine (2) and a second circuit (B) configured to cool a condenser (19) in a WHR system. The second circuit (B) has a second radiator (16), a first inlet opening (B1i) at which the second circuit (B) receives a coolant from a first position of the first circuit (A), a condenser inlet line (18) configured to direct coolant to the condenser (19) and an outlet opening (Bo) at which the coolant is directed back to the first circuit (A). The second circuit (B) further has a second radiator bypass line (14) directing coolant past the second radiator (16), and a second valve device (13, 13') configured to distribute the coolant between the second radiator (16) and the second radiator bypass line (14) such that a coolant mixture is received in the condenser inlet line (18) which is able to cool the working medium in the condenser (19) to a desired condensation temperature.

22 Claims, 4 Drawing Sheets (51) Int. Cl.
*F01K 23/10* (2006.01)
*F01P 7/16* (2006.01)
*F01P 7/14* (2006.01)

(58) Field of Classification Search
CPC ........ F01P 7/165; F01P 3/20; F01P 2007/146; F01P 2060/14; F01P 2003/185; F01P 2003/187; F02G 5/02; F02G 5/04; Y02T 10/12

See application file for complete search history.

(56) References Cited

U.S. PATENT DOCUMENTS

| | | | |
|---|---|---|---|
| 8,584,457 B2 | 11/2013 | Kardos | |
| 10,974,566 B2* | 4/2021 | Kim | B60H 1/00278 |
| 2009/0020079 A1 | 1/2009 | Muller et al. | 123/41.1 |
| 2010/0101224 A1* | 4/2010 | Kasuya | F02G 5/04 60/597 |
| 2010/0139626 A1 | 6/2010 | Raab et al. | 123/540 |
| 2010/0294217 A1* | 11/2010 | Kasuya | F02G 5/04 123/41.55 |
| 2013/0333640 A1 | 12/2013 | Kardos | |
| 2014/0208754 A1* | 7/2014 | Nagai | F01K 23/10 60/655 |
| 2016/0230643 A1 | 8/2016 | Honda | |
| 2017/0306806 A1* | 10/2017 | Kardos | F01K 23/065 |

FOREIGN PATENT DOCUMENTS

| | | |
|---|---|---|
| CN | 103237967 A | 8/2013 |
| CN | 103270270 A | 8/2013 |
| DE | 10 2013 209 045 A1 | 11/2014 |
| DE | 10 2014 019 684 A1 | 6/2015 |
| EP | 1816318 A1 | 8/2007 |
| EP | 2 559 879 A1 | 2/2013 |
| JP | 2007-321633 A | 12/2007 |
| SE | 1451489 * | 6/2016 |
| SE | 1650040 A1 | 7/2017 |
| WO | WO 2011/149409 A1 | 12/2011 |
| WO | WO 2012/087223 A1 | 6/2012 |
| WO | WO 2013/095262 A1 | 6/2013 |
| WO | WO 2014/181824 A1 | 11/2014 |
| WO | WO 2016/089276 A1 | 6/2016 |

OTHER PUBLICATIONS

European Search Report, dated Dec. 17, 2020, issued in corresponding European Patent Application No. 18812974.6. Total 8 pages.
Chinese Office Action, dated Jan. 6, 2021, issued in corresponding Chinese Patent Application No. 201880035849.9. English translation. Total 14 pages.
Korean Office Action, dated Jan. 25, 2021, issued in corresponding Korean Patent Application No. 10-2019-7036253. English translation. Total 20 pages.
Novelty Search Report dated Jan. 23, 2017.
Office Action dated Feb. 12, 2018 in corresponding Swedish Patent Application No. 1750716-1.
International Search Report dated Aug. 24, 2018 in corresponding PCT International Application No. PCT/SE2018/050556.
Written Opinion dated Aug. 24, 2018 in corresponding PCT International Application No. PCT/SE2018/050556.

* cited by examiner

COOLING SYSTEM FOR A COMBUSTION ENGINE AND A WHR SYSTEM

CROSS-REFERENCE TO RELATED APPLICATIONS

The present application is a 35 U.S.C. §§ 371 national phase conversion of PCT/SE2018/050556, filed Jun. 1, 2018, the contents of which are incorporated herein by reference, which claims priority of Swedish Patent Application No. 1750716-1 filed Jun. 7, 2017, the contents of which are incorporated by reference herein. The PCT International Application was published in the English language.

BACKGROUND OF THE INVENTION AND PRIOR ART

The present invention relates to a cooling system for a combustion engine and a WHR-system.

A WHR system (Waste Heat Recovery System) can be used in vehicles for recovering waste thermal energy and converting it to mechanical energy or electric energy. The waste heat energy from, for example, the exhaust gases from a combustion engine can be recovered by means of a WHR-system. Consequently, a WHR-system can reduce the fuel consumption of a combustion engine. In order to achieve a high thermal efficiency in a WHR-system, the working medium in the condenser is to be cooled to a condensation temperature as low as possible and substantially without subcooling. Consequently, in order to achieve a high thermal efficiency in a WHR-system, the working medium is to be cooled with a suitable cooling effect. However, the suitable cooling effect of the working medium in the condenser varies during different operating conditions such as with the heat effect supplied from, for example, the exhaust gases to the working medium in the evaporator. Since the supplied heat effect from exhaust gases can vary rapidly, it is difficult to continuously provide a cooling effect of the working medium in the condenser resulting in a high thermal efficiency of a WHR-system.

It is desirable to cool the WHR system and the combustion engine by a common cooling system. However, it is difficult to design such a cooling system in view of the facts that the required cooling effect for cooling of the working medium can vary rapidly and that the combustion engine and the WHR system require cooling by coolants of different temperatures.

WO 2016/089276 shows a cooling arrangement for a combustion engine and a WHR system. The cooling arrangement comprises a high temperature circuit, an intermediate temperature circuit and a low temperature circuit. Each comprises a radiator in which coolant is cooled to respective different temperatures. Coolant from the high temperature circuit or coolant from the low temperature circuit is mixed with coolant from the intermediate temperature circuit in order to create a coolant mixture of a suitable temperature for cooling the working medium in the condenser to a desirable condensation temperature.

SUMMARY OF THE INVENTION

The object of the present invention is to provide a relatively simple cooling system which is able to provide efficient cooling of a combustion engine and a working medium in a condenser of a WHR-system.

The above mentioned object is achieved by the cooling system disclosed herein. The cooling system comprises a first circuit used to cool the combustion engine and a second circuit used to cool the working medium in the condenser of the WHR system. The first circuit may have a conventional design for cooling a combustion engine. The second circuit comprises a second radiator, a second radiator bypass line and a second valve device distributing the coolant flow to the second radiator or to the second radiator bypass line in view of the cooling demand of the working medium in the condenser. The second circuit also comprises a condenser inlet line which receives a coolant mixture from the second radiator and the second radiator bypass line. By means of the second valve device, it is possible to cool an adjustable part of coolant flow in the second radiator while a remaining part of the coolant flows uncooled through the second radiator bypass line. The temperature of the coolant mixture directed to the condenser inlet line is related to the ratio between the coolant flows through the second radiator and the second radiator bypass line. The design of the second circuit makes it possible to control the flow and the temperature of the coolant directed to the condenser with high accuracy by means of the second valve device. The existence of the inlet opening where the second circuit receives coolant from the first circuit and the outlet opening where the second circuit directs the coolant back to the first circuit makes it possible to use the same coolant in both circuits. Furthermore, such a design causes a part of the first circuit and the second circuit to be arranged in parallel in the cooling system. By arranging the inlet opening and the outlet opening of the second circuit in suitable positions of the first circuit, the existence of the second circuit will substantially not disturb the cooling of the combustion engine in the first circuit.

According to an embodiment of the invention, the second circuit comprises an inlet for receiving coolant from an engine outlet line of the first circuit. In this case, the second circuit receives uncooled coolant of the first circuit. However, it is possible to cool the coolant in the second radiator to a relatively low temperature by a second radiator of a required size and/or direct a relatively small coolant flow to the second circuit.

According to an embodiment of the invention, the first inlet opening of the second circuit may be configured to direct the received coolant to the second bypass line and the second radiator. In this case, the coolant directed to the second radiator has initially the same temperature as the coolant directed to the second radiator bypass line.

According to an embodiment of the invention, the second valve device is a three way valve. However, it is possible to design the second valve device in other ways such as, for example, two way valves. The three way valve may comprises an inlet for receiving coolant, a first outlet for directing a part of the received coolant to the second radiator bypass line and a second outlet for directing a remaining part of the received coolant to the second radiator. The flow areas of the outlets may be adjustable in a stepless manner. Such a design makes it possible to distribute the received coolant flow between the second radiator and the second radiator bypass line with high accuracy. Alternatively, the three way valve may comprises a first inlet receiving coolant from the second radiator bypass line, a second inlet receiving coolant from the second radiator and an outlet directing a mixture of the received coolant flow to the condenser. In this case, the flow areas of the inlets may be adjusted in a stepless manner making it possible to receive varying coolant flows from the second radiator and the second radiator bypass line with high accuracy and which are directed in a mixed state by the outlet to the condenser inlet line.

According to an embodiment of the invention, the second circuit comprises a second inlet opening at which the second circuit receives coolant from a second position of the first circuit. The first inlet opening may be configured to direct coolant to the second radiator bypass line and the second inlet opening may be configured to direct coolant to the second radiator. This makes it possible to direct coolant of different temperatures to the second radiator and the second radiator bypass line. Preferably, the coolant of a lower temperature is directed to the second radiator. This measure makes it possible to receive a larger temperature difference between the coolant in the second radiator outlet line and the coolant in the second radiator bypass line which then in a mixed state is directed to the condenser inlet line.

According to an embodiment of the invention, the second inlet opening is configured to receive coolant from a first radiator outlet line of the first circuit. In this case, it is possible to direct a coolant flow of a relatively low temperature to the second radiator which further increases the possibility of providing a large temperature difference between the coolant in the second radiator outlet line and the coolant in the second radiator bypass line. The cooling system may comprise a valve member configured to control the coolant flow through the second inlet opening to the second circuit. This makes it is possible to control the coolant flow from the first radiator to the second radiator.

According to an embodiment of the invention, the outlet opening of the second circuit is configured to direct coolant back to an engine inlet line of the first circuit. In this case, the coolant flow from the condenser will be mixed with the ordinary coolant flow in the engine inlet line. The cooling system may comprise a coolant pump in the engine inlet line and the outlet of the second circuit is configured to direct coolant to a position upstream of the coolant pump in the engine inlet line. In this case, it is possible to use the same coolant pump for circulating coolant in the first circuit and the second circuit.

According to an embodiment of the invention, the cooling system comprises a control unit configured to receive information about at least one operating parameter and to control the valve arrangement in view of information. The control unit may, for example, receive information from a sensor sensing the actual condensation temperature in the condenser. In case the condensation temperature is too high, the control unit may control the second valve device such that coolant of a lower temperature is directed to the condenser. In case the condensation temperature is too low, the control unit may control the second valve device such that coolant of a higher temperature is directed to the condenser. Alternatively or in combination, the control unit may receive information about operating parameters related to the required cooling effect for cooling the working to a desired condensation temperature in the condenser. In view of this information, the control unit may estimate suitable combinations of coolant flow and coolant temperature to be directed to the condenser in order to obtain the desired condensation temperature of the working medium in the condenser.

The control unit may control the valve arrangement such that the coolant directed to the condenser has a temperature which results in cooling of the working medium in the condenser to a condensation pressure just above 1 bar. It is nearly always possible to provide a temperature of the coolant which results in cooling of the working medium in the condenser to a desired condensation temperature. However, for practical reasons, it is many times suitable to avoid negative pressures in a WHR-system. In this case, it is suitable to obtain a condensation pressure just above 1 bar. The desired pressure range may, for example, be in the range 1.1-1.5 bar. It is to be noted that a condensation temperature for a working medium has a corresponding condensation pressure.

The invention is also related to a vehicle comprising a cooling system according to any of the embodiments described above.

BRIEF DESCRIPTION OF THE DRAWINGS

In the following preferred embodiments of the invention are described, as examples, with reference to the attached drawing, in which.

DETAILED DESCRIPTION OF PREFERRED EMBODIMENTS OF THE INVENTION

Figure 1:
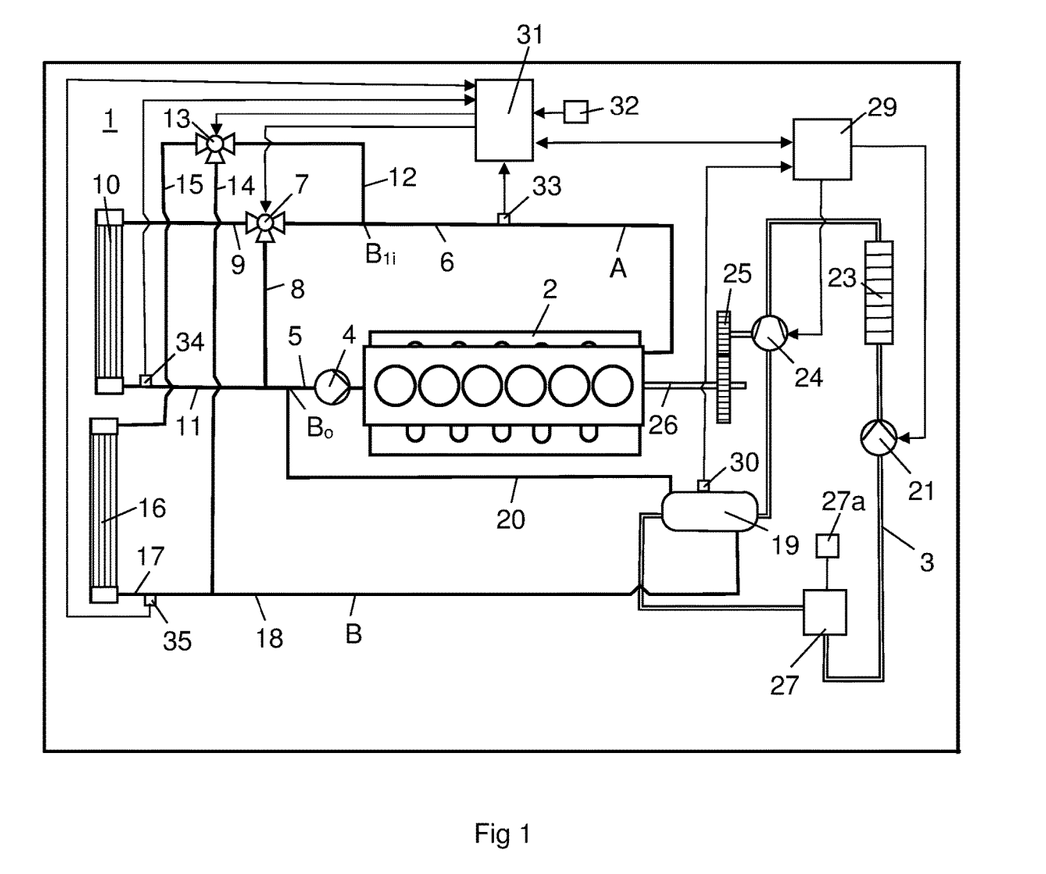
FIG. 1 shows a cooling system according to a first embodiment of the invention.

FIG. 1 shows a schematically indicated vehicle 1 powered by a combustion engine 2. The vehicle 1 may be a heavy vehicle and the combustion engine 2 may be a diesel engine. The vehicle 1 comprises a cooling system comprising a first circuit A configured for cooling the combustion engine 2 and a second circuit B configured for cooling a WHR system 3. The first circuit A comprises a coolant pump 4. The coolant pump 4 is arranged in an engine inlet line 5 directing coolant to the combustion engine 2. The coolant pump 4 may be a mechanical pump operated by a component in the powertrain of the vehicle 1. An engine outlet line 6 receives coolant from the combustion engine 2. Usually, the coolant leaving the combustion engine 2 has the highest temperature in the cooling system. A first valve device in the form of a first three way valve 7 is arranged at a downstream end portion of the engine outlet line 6. The first three way valve 7 comprises an inlet receiving coolant from the engine outlet line 6, a first outlet directing coolant to a first radiator bypass line 8 and a second outlet directing coolant to a first radiator inlet line 9. The outlets of the first three way valve 7 are adjustable in a stepless manner. Thus, the first three way valve 7 can distribute the received coolant flow between the first radiator bypass line 8 and the first radiator inlet line 9 in a stepless manner. The first radiator inlet line 9 directs coolant to a first radiator 10. A not shown radiator fan and ram air provides a cooling air flow through the first radiator 10 which cools the coolant. The coolant leaving the first radiator 10 is received in a first radiator outlet line 11. The first radiator bypass line 8 and the first radiator outlet line 11 are connected to the engine inlet line 5 in a position upstream of the coolant pump 4. The coolant pump 4, the engine inlet line 5, the combustion engine 2, the engine outlet line 6, the first three way valve 7, the first radiator bypass line 8, the first radiator inlet line 9 the first radiator 10 and the first radiator outlet line 11 are comprised in the first circuit A of the cooling system.

The second circuit B comprises a first inlet opening $B_{1i}$ at which the second circuit B receives coolant from the first circuit A. The first inlet opening $B_{1i}$ receives coolant from the engine outlet line 6 in an upstream position of the first three way valve 7. The first inlet opening $B_{1i}$ directs the received coolant to an inlet line 12. A second valve device in the form of a second three way valve 13 is arranged in a downstream end of the inlet line 12. The second three way valve 13 has an inlet receiving coolant from inlet line 12, a first outlet directing coolant to a second radiator bypass line 14 and a second outlet directing coolant to a second radiator inlet line 15. The outlets of the first three way valve 7 are adjustable in a stepless manner. Thus, the second three way valve 13 can distribute the coolant flow from the inlet line 12 between the second radiator bypass line 14 and the second radiator inlet line 15 in a stepless manner. The second radiator inlet line 15 directs coolant to a second radiator 16. The coolant leaving the second radiator 16 is received in a second radiator outlet line 17. The second radiator bypass line 14 and the second radiator outlet line 17 direct coolant to a condenser inlet line 18. The condenser inlet line 18 directs the mixed coolant flows to a condenser 19 of the WHR system 3. An outlet line 20 directs coolant from the condenser 19 to an outlet opening $B_o$ of the second circuit B. The outlet opening $B_o$ is located upstream of the coolant pump 4 in the engine inlet line 5. The first inlet opening $B_{1i}$, the inlet line 12, the second three way valve 13, the second radiator bypass line 14, the second radiator inlet line 15, the second radiator 16, the second radiator outlet line 17, the condenser inlet line 18, the condenser 19, the outlet line 20 and the outlet opening $B_o$ are comprised in the second circuit B.

Thus, the vehicle is provided with a WHR-system (Waste Heat Recovery system). The WHR-system comprises a working medium pump 21 which pressurizes and circulates a working medium in a closed a circuit 3. In this case, the working medium is ethanol. However, it is possible to use other kinds of working mediums, for example R245fa. The working medium pump 21 pressurizes and circulates the working medium to an evaporator 23. The working medium is heated in the evaporator 23, for example, by exhaust gases from the combustion engine to a temperature at which it evaporates. The working medium is circulated from the evaporator 23 to the expander 24. The pressurised and heated working medium expands in the expander 24. The expander 24 generates a rotary motion which may be transmitted, via a suitable mechanical transmission 25, to a shaft 26 of the powertrain of the vehicle 1. Alternatively, the expander 24 may be connected to a generator transforming mechanical energy into electrical energy. The electrical energy may be stored in a battery. The stored electrical energy can be supplied to an electrical engine for driving of the vehicle 1 or a component on the vehicle 1 in a later state.

After the working medium has passed through the expander 24, it is led to the condenser 19. The working medium is cooled in the condenser 16 by coolant from the cooling system to a temperature at which it condenses. The working medium is led from the condenser 16 to a receiver 27. The pressure in the receiver 27 can be varied by means of a pressure regulator 27a. The pump working medium 21 sucks working medium in a liquid state from the receiver 27. A control unit 29 controls the operation of the WHR-system. The control unit 29 controls the operation of the working medium pump 21 and the expander 24. The WHR-system makes it possible to transform thermal energy from the exhaust gases to mechanical energy or electrical energy. A temperature sensor or a pressure sensor 30 senses the condensation temperature or the condensation pressure in the condenser 19.

The temperature of exhaust gases and thus the heating effect of the working medium in the evaporator 23 varies during different operating conditions. In order to maintain a substantially continuously high thermal efficiency in the WHR-system, the working medium in the condenser 19 is to be cooled with an adjustable cooling effect. It is favorable to establish a condensation pressure as low as possible at the different operating conditions. However, it is suitable to avoid negative pressure in the WHR-system by practical reasons. In view of these facts, it is suitable to provide a cooling of the working medium in the condenser 19 to a condensation pressure just above 1 bar. Consequently, in order to maintain a high thermal efficiency it is necessary to adjust the cooling effect of the working medium in the condenser 19 in view of the supplied heat energy from the exhaust gases such that the condensation pressure will be just above 1 bar. The working medium ethanol has a condensation temperature of 78° C. at 1 bar. In this case, it is suitable to accomplish a condensation temperature of just above 78° C. in the condenser 19.

A control unit 31 controls the coolant flow through the first circuit A by means of the first three way valve 7 and the coolant flow through the second circuit B by means of the second three way valve 13. The control unit 31 controls the first three way valve 7 and the second three way valve 13 by means of information 32 about suitable operating parameters. The control unit 31 may, for example, estimate the coolant flow by means of information 32 about the speed of the coolant pump 4. The control unit 31 may also receive information from a number of temperature sensors 33, 34, 35 sensing the coolant temperature in relevant positions of the cooling system. In this case, the control unit 31 receives information from a first temperature sensor 33 sensing the temperature of the coolant in the engine outlet line 6, a second temperature sensor 34 sensing the temperature of the coolant in the first radiator outlet line 11 and a third temperature sensor 35 sensing the temperature of the coolant in the second radiator outlet line 17.

During operation of the combustion engine 2, the control unit 31 controls the first three way valve 7 by at least information from the first temperature sensor 33 about the temperature of the coolant in the engine outlet line 6. The temperature of the coolant in the engine outlet line 6 is related to the temperature of the combustion engine 2. In case the coolant temperature is below a desired operating temperature range, the control unit 31 sets the first three way valve 7 in a position in which the entire coolant flow is directed to the first radiator bypass line 8. In case the coolant temperature is above the desired operating temperature range, the control unit 31 sets the thermostat in a position in which the entire coolant flow is directed to the first radiator inlet line 9. In case the coolant temperature is within the desired operating temperature range, the control unit 31 sets the first three way valve 7 in a position in which a part of the coolant is directed to the first radiator bypass line 8 and a remaining part of the coolant is directed to the first radiator inlet line 9.

During operation of the WHR system, the control unit 31 estimates a desired condensation temperature of the working medium in the condenser 16. When ethanol is used as working medium, a condensation temperature of about 80° C. is desirable during most operating conditions. The control unit 31 receives information from the second control unit 29 about relevant operating parameters of the WHR system. In view of this information, the control unit 31 estimates or calculates the required cooling effect of the working medium in the condenser 19 for receiving the desired condensation temperature of the working medium in the condenser 19.

The control unit 31 receives information 32 about the speed of the coolant pump 4 and information from at least the first temperature sensor 33 about the temperature of the coolant in the engine outlet line 6. In view of this information, the control unit 31 estimates or calculates a suitable distribution of the coolant flow in the inlet line 12 between the second radiator 16 and the second radiator bypass line 14 such that a coolant mixture is received in the condenser inlet line 18 having a suitable temperature for cooling the working medium in the condenser 19 to the desired condensation temperature. The control unit 31 controls the second three way valve 13 such that the estimated distribution of the coolant flow to the second radiator 16 and the second radiator bypass line 14 is performed. The condenser inlet line 18 directs the received coolant mixture to the condenser 19. The coolant cools the working medium in the condenser 19 to the desired condensation temperature whereupon it is directed, via the second parallel circuit outlet line 20, back to the engine inlet line 5 in the first circuit A.

Figure 2:
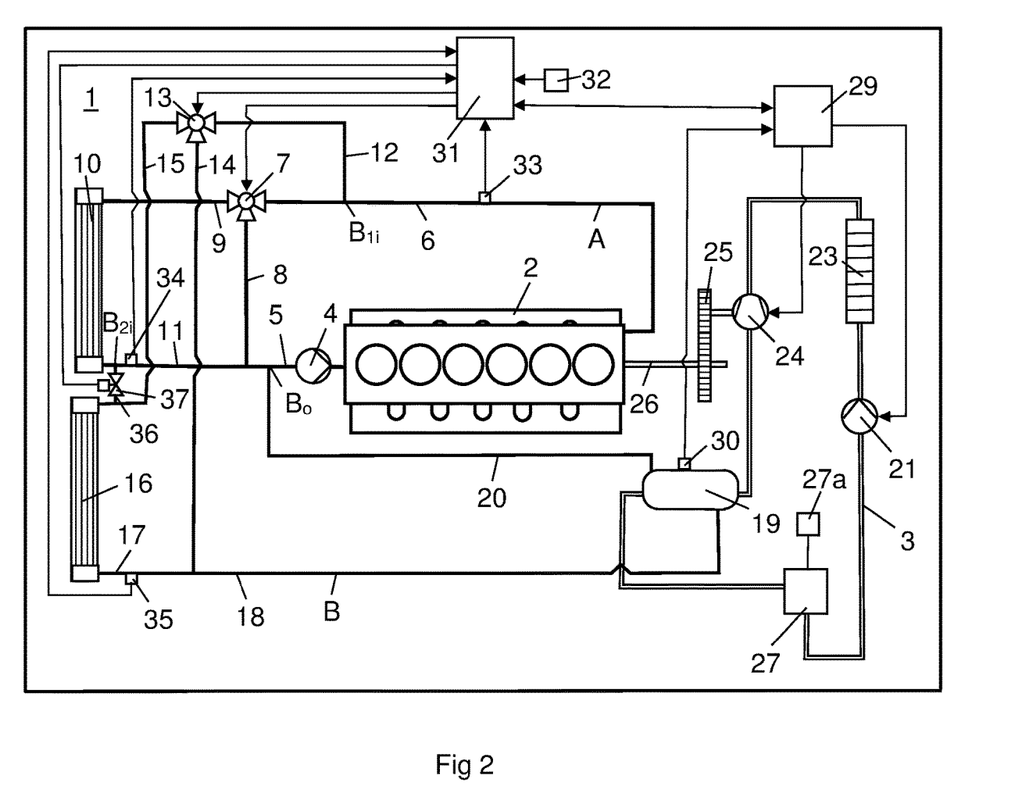
FIG. 2 shows a cooling system according to a second embodiment of the invention.
Figure 3:
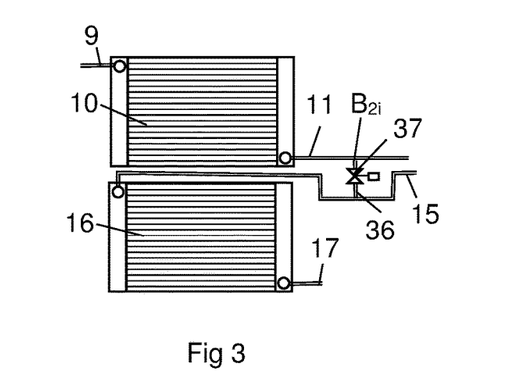
FIG. 3 shows the two radiators in FIG. 2 more in detail.

FIGS. 2 and 3 shows an alternative embodiment of the cooling system. In this case, the second circuit B is provided with a second inlet opening $B_{2i}$ directing coolant from the first radiator outlet line 11 to an additional inlet line 36. The additional inlet line 36 directs coolant to the second radiator inlet line 15. A valve member 37 is arranged in the additional inlet line 36. During operating conditions, when it is difficult to cool the coolant to a desired low temperature in the second radiator 16, it is possible to control the valve member 37 such that a part of the coolant flow in the first radiator outlet line 11 is directed to the second radiator 16. Since the coolant leaving the first radiator 10 has a relatively low temperature, it is possible to direct coolant of a lower temperature to the second radiator 16 and provide a lower temperature of the coolant leaving the second radiator 16 than in the embodiment shown in FIG. 1.

Figure 4:
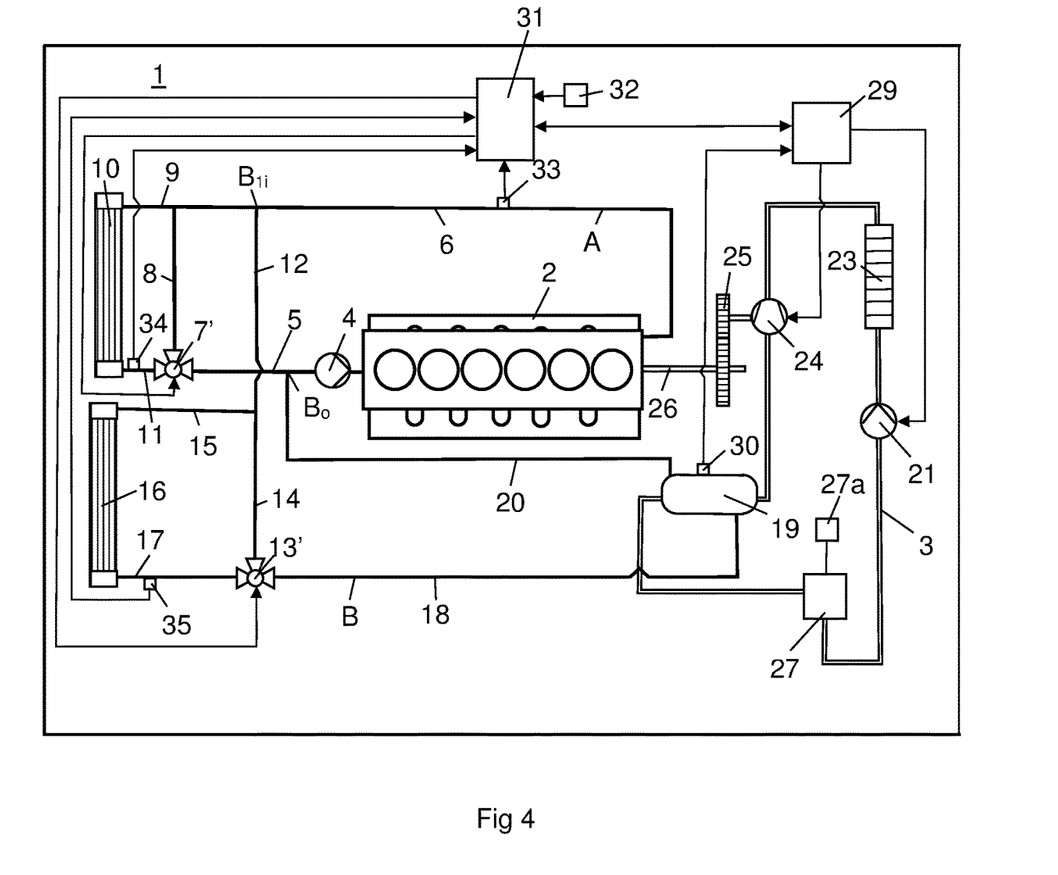
FIG. 4 shows a cooling system according to a third embodiment of the invention and FIG. 5 shows a cooling system according to a fourth embodiment of the invention.

FIG. 4 shows a further embodiment of the cooling system. In this case, the first circuit A comprises a first valve device in the form of a first three way valve 7' arranged in a connecting point of the first radiator bypass line 8 and the first radiator outlet line 11. The first three way valve 7' comprises a first inlet receiving coolant from the first radiator bypass line 8, a second inlet receiving coolant from the first radiator outlet line 11 and an outlet directing the received coolant to the engine inlet line 5. The first inlet opening $B_{1i}$ of the first circuit B directs coolant from the engine outlet line 6 to an inlet line 12. The inlet line 12 is branched into a second radiator bypass line 14 and a second radiator inlet line 15 directing coolant to the second radiator 16. The second circuit B comprises a second three way valve 13' arranged in a connection point of the second radiator bypass line 14 and the second radiator outlet line 17. Thus, the second three way valve 13' comprises a first inlet receiving coolant from the second radiator bypass line 14, a second inlet receiving coolant from the second radiator outlet line 17 and an outlet directing the received coolant to the condenser inlet line 18. The inlets of the second three way valve 13' are adjustable such that it is possible to distribute the coolant flow between the second radiator bypass line 14 and the second radiator outlet line 17 in a stepless manner.

Figure 5:
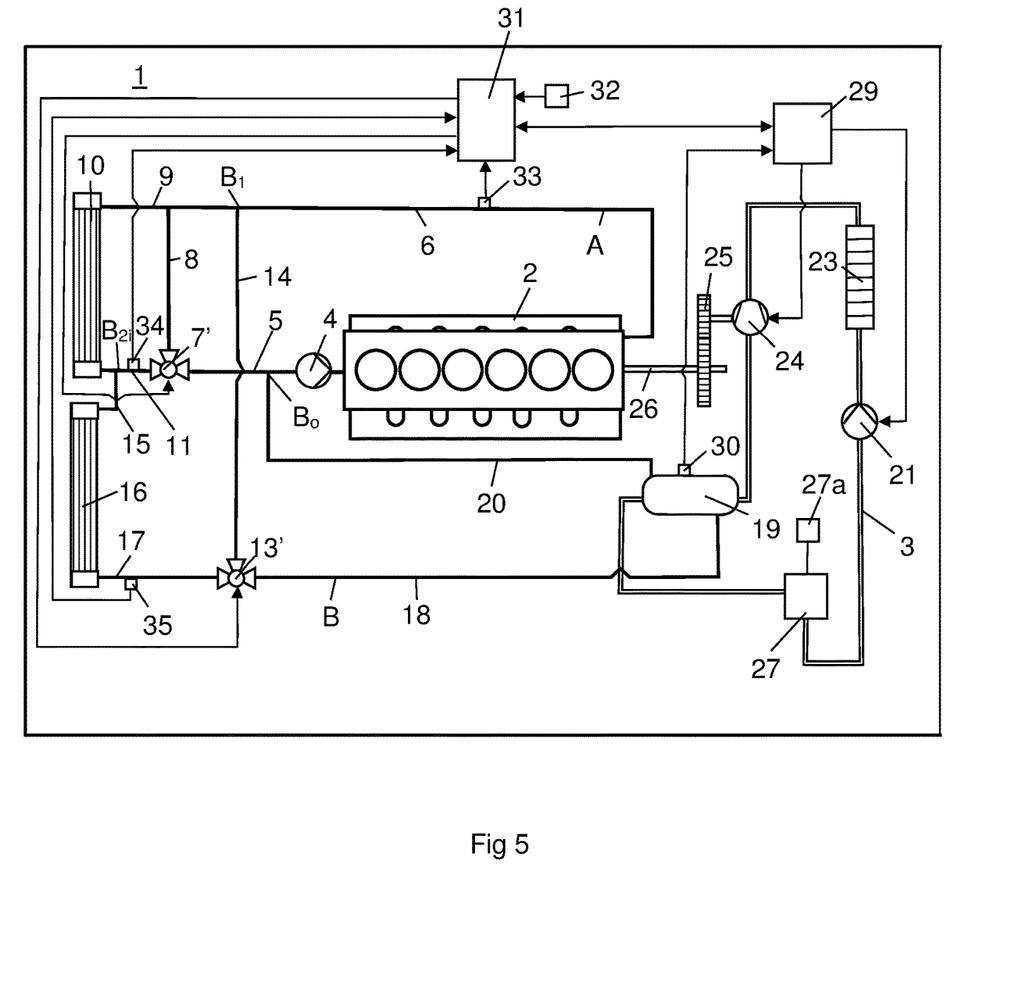

FIG. 5 shows a further embodiment of the cooling system. In this case, the second circuit B receives coolant from a first inlet opening $B_{1i}$ which directs the coolant to the second radiator bypass line 14 and from a second inlet opening $B_{2i}$ which directs the coolant to a second radiator inlet line 15. In this case, a part of the coolant flow leaving the first radiator 10 is directed to the second radiator 16 where it is cooled in a second step. The second circuit B comprises a second three way valve 13' arranged in a connection point of the second radiator bypass line 14 and the second radiator outlet line 17. The second three way valve 13' comprises a first inlet receiving coolant from the second radiator bypass line 14, a second inlet receiving coolant from the second radiator outlet line 17 and an outlet directing the received coolant to the condenser inlet line 18. The inlets of the second three way valve 13' are adjustable such that it is possible to distribute the coolant flow between the second radiator bypass line 14 and the second radiator outlet line 17 in a stepless manner. In this case, it is possible to provide coolant of a very low temperature in the second radiator outlet line 17.

The invention is not restricted to the described embodiment but may be varied freely within the scope of the claims.

The invention claimed is:

1. A cooling system for a combustion engine and a WHR-system, wherein the cooling system comprises:
    a first circuit (A) with a circulating coolant therein, the first circuit being configured to cool the combustion engine, the first circuit (A) comprises a first radiator, a first radiator bypass line configured to direct coolant past the first radiator and a first valve device configured to distribute the coolant flow from the combustion engine between the first radiator and the first radiator bypass line;
    a second circuit (B) with a circulating coolant therein, the second circuit being configured to cool a condenser in the WHR system, the second circuit comprises a second radiator, a first inlet opening at which the second circuit (B) receives coolant from an engine outlet line of the first circuit (A), a condenser inlet line configured to direct coolant to the condenser of the WHR system, an outlet opening at which the coolant is directed back to the first circuit (A);
    a second radiator bypass line directing coolant past the second radiator, and a second valve device configured to distribute the coolant between the second radiator and the second radiator bypass line such that a coolant mixture is received in the condenser inlet line, and the coolant mixture is able to cool the working medium in the condenser to a desired condensation temperature;
    the second circuit (B) comprises a second inlet opening ($B_{2i}$) at which the second circuit (B) receives coolant from a second position of the first circuit (A); and
    the cooling system comprises a valve member configured to control the coolant flow through the second inlet opening to the second circuit (B).

2. The cooling system according to claim 1, further comprising the first inlet opening of the second circuit (B) is configured to direct the received coolant to the second radiator bypass line and to the second radiator.

3. The cooling system according to claim 2, further comprising the second valve device is a three way valve.

4. The cooling system according to claim 3, further comprising the second valve device comprises an inlet for receiving coolant from the first circuit (A), a first outlet from the first circuit directing a part of the received coolant to the second radiator bypass line and a second outlet directing a remaining part of the received coolant to the second radiator.

5. The cooling system according to claim 3, further comprising the second valve device comprises a first inlet for receiving coolant from the second radiator bypass line, a second inlet receiving coolant from the second radiator and an outlet directing a mixture of the received coolant to the condenser inlet line.

6. The cooling system according to claim 1, wherein the second inlet opening is configured to receive coolant from a first radiator outlet line of the first circuit (A).

7. The cooling system according to claim 1, further comprising the outlet opening of the second circuit (B) is configured to return coolant to an engine inlet line of the first circuit (A).

8. The cooling system according to claim 1, further comprising the first circuit comprises a coolant pump arranged in the engine inlet line; and
the outlet opening of the second circuit (B) is configured to return coolant to the engine inlet line in a position upstream of the coolant pump.

9. The cooling system according to claim 1, further comprising a control unit configured to receive information about at least one operating parameter and to control the valve devices based on this information.

10. The cooling system according to claim 9, further comprising the control unit may control the second valve device such that the coolant directed to the condenser has a temperature which results in a cooling of the working medium in the condenser to a condensation pressure above 1 bar.

11. The vehicle comprising a cooling system according to claim 1.

12. The cooling system for a combustion engine and a WHR-system, wherein the cooling system comprises:
a first circuit (A) with a circulating coolant therein, the first circuit being configured to cool the combustion engine, the first circuit (A) comprises a first radiator, a first radiator bypass line configured to direct coolant past the first radiator and a first valve device configured to distribute the coolant flow from the combustion engine between the first radiator and the first radiator bypass line;
a second circuit (B) with a circulating coolant therein, the second circuit being configured to cool a condenser in the WHR system, the second circuit comprises a second radiator, a first inlet opening at which the second circuit (B) receives coolant from an engine outlet line of the first circuit (A), a condenser inlet line configured to direct coolant to the condenser of the WHR system, an outlet opening at which the coolant is directed back to the first circuit (A);
a second radiator bypass line directing coolant past the second radiator, and a second valve device configured to distribute the coolant between the second radiator and the second radiator bypass line such that a coolant mixture is received in the condenser inlet line, and the coolant mixture is able to cool the working medium in the condenser to a desired condensation temperature;
the second circuit (B) comprises a second inlet opening ($B_{2i}$) at which the second circuit (B) receives coolant from a second position of the first circuit (A); and
the first inlet opening is configured to direct coolant to the second radiator bypass line, and the second inlet opening is configured to direct coolant to the second radiator.

13. The cooling system according to claim 12, further comprising the first inlet opening of the second circuit (B) is configured to direct the received coolant to the second radiator bypass line and to the second radiator.

14. The cooling system according to claim 13, further comprising the second valve device is a three way valve.

15. The cooling system according to claim 14, further comprising the second valve device comprises an inlet for receiving coolant from the first circuit (A), a first outlet from the first circuit directing a part of the received coolant to the second radiator bypass line and a second outlet directing a remaining part of the received coolant to the second radiator.

16. The cooling system according to claim 14, further comprising the second valve device comprises a first inlet for receiving coolant from the second radiator bypass line, a second inlet receiving coolant from the second radiator and an outlet directing a mixture of the received coolant to the condenser inlet line.

17. The cooling system according to claim 12, wherein the second inlet opening is configured to receive coolant from a first radiator outlet line of the first circuit (A).

18. The cooling system according to claim 12, further comprising the outlet opening of the second circuit (B) is configured to return coolant to an engine inlet line of the first circuit (A).

19. The cooling system according to claim 12, further comprising the first circuit comprises a coolant pump arranged in the engine inlet line; and
the outlet opening of the second circuit (B) is configured to return coolant to the engine inlet line in a position upstream of the coolant pump.

20. The cooling system according to claim 12, further comprising a control unit configured to receive information about at least one operating parameter and to control the valve devices based on this information.

21. The cooling system according to claim 20, further comprising the control unit may control the second valve device such that the coolant directed to the condenser has a temperature which results in a cooling of the working medium in the condenser to a condensation pressure above 1 bar.

22. A vehicle comprising a cooling system according to claim 12.

* * * * *